(12) United States Patent
Tali (10) Patent No.: US 10,592,378 B1
(45) Date of Patent: Mar. 17, 2020

(54) MANAGING MONITORING FEATURE OVERHEAD

(71) Applicant: CA, Inc., New York, NY (US)

(72) Inventor: Martin Tali, Foster City, CA (US)

(73) Assignee: CA, Inc., New York, NY (US)

(*) Notice: Subject to any disclaimer, the term of this patent is extended or adjusted under 35 U.S.C. 154(b) by 0 days.

(21) Appl. No.: 16/152,401

(22) Filed: Oct. 4, 2018

(51) Int. Cl.
*G05B 13/02* (2006.01)
*G06F 11/34* (2006.01)
*G06F 11/30* (2006.01)
*G06F 3/0484* (2013.01)

(52) U.S. Cl.
CPC ........ *G06F 11/3409* (2013.01); *G06F 11/302* (2013.01); *G06F 3/04845* (2013.01)

(58) Field of Classification Search
CPC . G06F 11/3409; G06F 11/302; G06F 3/04845
See application file for complete search history.

(56) References Cited

U.S. PATENT DOCUMENTS 9,356,883 B1 * 5/2016 Borthakur ........... H04L 41/5025
2005/0132041 A1 * 6/2005 Kundu ................... G06Q 40/04
709/224
2014/0282503 A1 * 9/2014 Gmach ............... H04L 41/0823
718/1
2015/0278024 A1 * 10/2015 Barman ........... G06F 16/24578
707/634
2018/0004436 A1 * 1/2018 Prahlad ................ G06F 3/0619

FOREIGN PATENT DOCUMENTS

WO       2012106571 A2    8/2012

* cited by examiner

*Primary Examiner* — Brian W Wathen
*Assistant Examiner* — Abdou K Seye
(74) *Attorney, Agent, or Firm* — Foley & Lardner LLP (57) ABSTRACT

A customer-facing overhead management tool reduces the task of feature configuration to adjusting a scale representing relative feature availability. Features are configured by adjusting a graphical control element presented on a graphical user interface to activate or deactivate features based on relative weights and priorities associated with the features. Weights and priorities are stored within a configuration file underlying the control element and indicate an approximate order in which features will be deactivated upon "dialing down" the available features. The control element facilitates application resource management for the customer, as the customer may configure features to reduce overhead without knowledge of the underlying feature priorities and weights or relative overhead each feature incurs when activated. Customers may override the automatic feature adjustment by manually activating features which have been deactivated following a lowering of the value on the control element.

20 Claims, 5 Drawing Sheets

MANAGING MONITORING FEATURE OVERHEAD

BACKGROUND

The disclosure generally relates to the field of data processing, and more particularly to software development, installation, and management.

Application performance management involves the collection of numerous metric values for an application. For a distributed application, an application performance management application or tool will receive these metric values from probes or agents that are deployed across application components to collect the metric values and communicate them to a repository for evaluating. The collected metric values are monitored and analyzed to evaluate performance of the application, detect anomalous behavior, and inform root cause analysis for anomalous behavior.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

An application monitoring probe or agent deployed by an application performance management application or tool can be configured for different levels of feature instrumentation. Features can be activated or deactivated in the agent to provide different levels of instrumentation. Customers utilizing an application performance management application to monitor performance of a deployed application can manually instrument features of an application monitoring agent. Activating and disabling features impacts application resource consumption. If a customer activates a combination of features which cause high application resource consumption or overhead, external services or support may be sought to readjust features to reduce resource consumption since customers typically lack the depth of knowledge to expertly adjust features of an application monitoring agent. Seeking outside support to resolve resource consumption issues may cause a delay in response time and thus a delay in continuing optimal use of the application. Further, utilizing outside support to reconfigure features may increase costs.

A customer-facing overhead management tool reduces the task of feature configuration to adjusting a scale representing relative feature availability. Features are configured by adjusting a graphical control element (e.g., a slider or knob) presented on a graphical user interface (GUI) to activate or deactivate features based on relative weights and priorities associated with the features. Weights and priorities are stored within a configuration file underlying the control element and indicate an approximate order in which features will be deactivated upon "dialing down" the available features. The control element facilitates application resource management for the customer, as the customer may configure features to reduce overhead without knowledge of the underlying feature priorities and weights or relative overhead each feature incurs when activated. Moreover, different combinations of features can incur different amounts of resource consumption overhead. Customers may override the automatic feature adjustment by manually activating features which have been deactivated following a lowering of the value on the control element. Over time, based on observed manual activation of features with a lower initial prioritization, customer preferences may be learned through a feedback loop. Feature priorities can then be adjusted in response to learned preferences.

Example Illustrations

Figure 1:
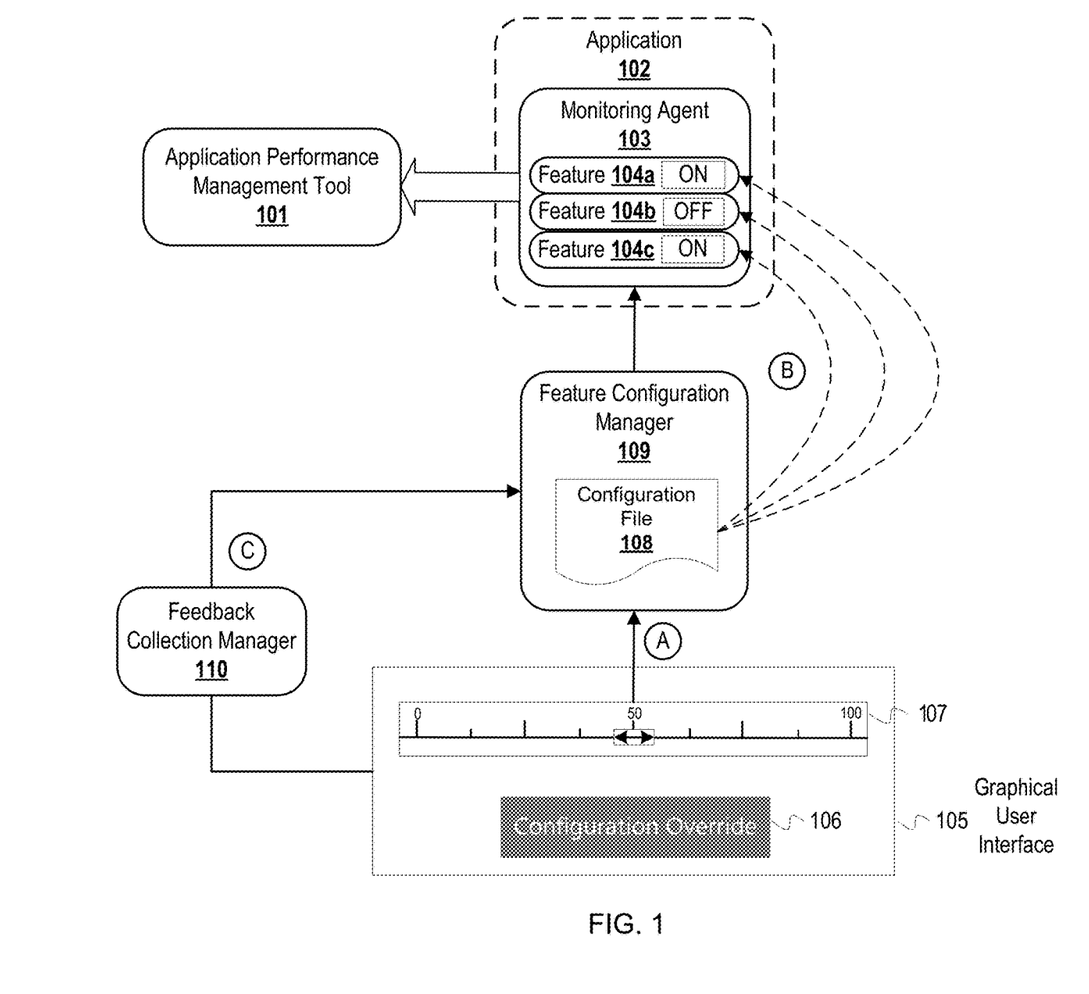
FIG. 1 is a conceptual diagram depicting a feature configuration manager which adjusts application monitoring feature availability based on an indicated level of application overhead.

FIG. 1 is a conceptual diagram depicting a feature configuration manager which adjusts application monitoring feature availability based on an indicated level of application overhead. FIG. 1 depicts a monitoring agent 103 ("agent 103") which monitors an application 102. The agent 103 communicates measurements of monitored performance metrics of the application 102 to an application performance management tool 101 ("tool 101"). The agent 103 can instrument the application 102 to collect the measurements based on features activated for the agent 103. A feature corresponds to a performance metric or multiple performance metrics of the application 102. In this illustration, the agent 103 has feature 104a, feature 104b, and feature 104c. FIG. 1 also depicts a GUI 105 which shows a scale of overhead values. The GUI 105 includes a slider 107 and a configuration override button 106 ("configuration override 106").

FIG. 1 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the feature configuration manager 109 detects manipulation of the slider 107. The slider 107 is a graphical control element which depicts a range of numerical values. Each value represents a degree of instrumentation or monitoring that corresponds to relative proportion of incurred resource consumption ("relative overhead value"). In response to selection of a relative overhead value via manipulation of the slider 107, a feature configuration manager 109 activates features such that the combination of active features incurs the selected relative overhead value. Manipulating the slider 107 to a greater value activates one or more additional features, which increases resource consumption. Manipulating the slider 107 to a lower value deactivates one or more features of the agent 103, which decreases resource consumption. For example, if the slider 107 is set to a relative overhead value of 100, all features 104a-104c will be activated. If the slider 107 is set to a relative overhead value of 0, all features 104a-104c will be deactivated, assuming none of the features 104a-104c are specified as mandatory. If the slider 107 is set at an intermediate relative overhead value, some combination of features 104a, 104b, and 104c will be activated such that the relative resource consumption of the activated features achieves the indicated relative overhead value.

The slider 107 may have been manipulated to either increase or decrease the relative overhead value. After the indicated relative overhead value is communicated to the feature configuration manager 109, the manager 109 determines if features should be activated or deactivated based on whether the relative overhead value has been increased or decreased. Features will be activated or deactivated according to weights and priorities which are stored for each feature in a configuration file 108 underlying the slider 107. The configuration file 108 lists each feature and its associated parameters, which include a priority, relative weight, and set of properties and flags. The weight indicates the amount of overhead a feature incurs relative to the total amount of overhead which would be incurred by activating all agent features. Weight assignment calculations may account for central processing unit (CPU) overhead, which is determined by the number of CPU cycles used by computing tasks related to the feature. Weight assignment calculations may also account for memory consumption and response time overhead which a feature incurs. Response time overhead is measured based on delay or slowing of application response time when utilizing a feature (e.g., the number of milliseconds an application response is slowed when the feature is in use).

Initial weights may be determined from a preliminary overhead analysis by monitoring resource consumption of active features. For example, instrumentation points may be placed to monitor resource usage within a given time interval, such as by setting start and stop points for a CPU timer. Once the CPU timer finishes, the resource consumption between the start and stop points is available. The CPU overhead for a feature can then be estimated based on the CPU activity which was monitored between the start and stop points. Initial weights may also be based on an analysis of how feature implementation affects resource consumption (e.g., with a preliminary analysis of the feature source code file). In some embodiments, default weights can be assigned based on expert knowledge for prior assessments in different environments. These weights can then be adjusted after deployment based on post-deployment observations.

Order of activation and deactivation of features is based on the priorities of the features. The priority assigned to a feature is relative to the other available features of the agent 103. Priorities of features may approximately correspond to the frequencies with which features will be active. Initial priorities may be determined based on prior customer feedback indicating which features are most often used. The configuration file 108 may list settings of instrumentation point flags and properties for each feature. Instrumentation point flags can indicate on or off values (e.g., "true" or "false" flags) for each instrumentation point listed in an instrumentation directive file associated with the feature. Altering an instrumentation point flag results in starting or stopping collection of application metrics at that instrumentation point. Feature property settings dictate how instrumentation metrics are obtained for reporting to the tool 101. For instance, application metrics may be obtained through database schema-based collection or through uniform resource locator-based (URL) collection. The feature property may then indicate which of the methods the feature instrumentation points should use for collection of application 102 performance metrics. Settings for the flags and properties which are listed in the configuration file 108 may correspond to an "on" and "off" setting. The "on" and "off" settings indicate how flags and properties should be configured in order to activate or deactivate the feature in the agent 103. For example, the "on" setting for feature 104a can indicate a set of instrumentation points with a corresponding "true" flag as well as a set of properties which indicate how the metrics are obtained for each of the instrumentation points. When feature 104a is activated, the corresponding instrumentation points are turned on and will begin collecting metrics of the application 102 through the method dictated by the properties.

At stage B, the feature configuration manager 109 activates and/or deactivates features until the combination of active features incurs the relative overhead value or has a computed relative overhead value which was selected with the slider 107. The configuration manager 109 incrementally activates features if the relative overhead value was increased or incrementally deactivates if the relative overhead value was decreased.

If the feature configuration manager 109 detects an increase in the relative overhead value, the manager 109 sequentially inspects feature priorities and activates additional features until the relative overhead value has been satisfied. After activating a feature, the feature weight is added to a cumulative sum of the weights of active features, where the previous relative overhead value serves as the initial value of the cumulative sum. Features are activated in the order of highest priority to lowest priority until the cumulative sum of active feature weights achieves the relative overhead value. For instance, feature 104a may have the highest priority indicated in the configuration file 108 and a relative weight of 25%. Features 104b and 104c may have the second and third highest priorities and weights of 30% and 45%, respectively. If all features are deactivated and the feature configuration manager 109 detects an increase in the relative overhead value from 0 to 25, the manager 109 will activate feature 104a. After determining that the relative overhead contribution of feature 104a meets the indicted relative overhead value, the remaining features will not be activated. When inspecting priorities, if the inactive feature with the highest priority has a weight which exceeds the relative overhead value, the feature configuration manager 109 may still activate the feature.

If the feature configuration manager 109 detects a decrease in the relative overhead value, the manager 109 sequentially inspects feature priorities and deactivates features until the relative overhead value has been satisfied. After deactivating a feature, the feature weight is subtracted from the cumulative sum of the weights of active features. Features are deactivated in the order of lowest priority to highest priority until the cumulative sum of the weights of the remaining active features achieves the relative overhead value. For instance, feature 104a may have the lowest priority indicated in the configuration file 108 and a weight of 10%. Features 104b and 104c may have the second and third lowest priorities and weights of 30% and 60%, respectively. If all features are activated and the feature configuration manager 109 detects a decrease in the relative overhead value from 100 to 60, the manager 109 will deactivate feature 104a followed by feature 104b. After determining that the indicated relative overhead value has been met by removing the overhead contributed by features 104a and 104b, feature 104c will not be deactivated. When inspecting priorities, if the active feature with the lowest priority has a weight which exceeds the relative overhead value, the feature configuration manager 109 may still deactivate the feature.

In an embodiment, instead of sequentially inspecting feature priorities and activating or deactivating features until the relative overhead value has been satisfied, the feature configuration manager 109 iterates through each of the features from highest to lowest priority upon detecting manipulation of the slider 107. The feature configuration manager 109 activates features until a cumulative sum of feature weights satisfies the relative overhead value. Once the relative overhead value has been achieved, the feature configuration manager 109 deactivates the remaining features. Each feature is inspected and either activated or deactivated based on satisfaction of the relative overhead value by the cumulative sum of feature weights. If the feature configuration manager 109 activates a feature which is already activated or deactivates a feature which is already deactivated, no action is taken. Pseudocode for iterative updating of features is depicted and described below.

```
Procedure Slider_Adjustment_Detected( ){
    Slider=get_desired_relative_overhead_value( );
    Relative_overhead_value=Total_weight_of_all_features*Slider/100;
    Cumulative_weight=0;
    Features=sort_by_priority(Features);
    For each Feature in Features {
    Cumulative_weight=Cumulative_weight+
        Feature.weight;
    if (Cumulative_weight<Relative_overhead_value)
        Feature.activate( );
    Else
        Feature.deactivate( );
    }
}
```

After obtaining the relative overhead value indicated by the slider 107 and determining a corresponding boundary for the cumulative sum of feature weights, the feature configuration manager 109 sorts the features by priority order. The feature configuration manager 109 then iterates through the features from highest to lowest priority and calculates the cumulative sum of the weights of features which have been examined. The feature configuration manager 109 determines if the cumulative sum has satisfied the relative overhead value. If the cumulative sum has not yet satisfied the relative overhead value, the feature configuration manager 109 activates the current feature. Otherwise, the feature configuration manager 109 deactivates the current feature. Once each feature has been examined for activation or deactivation, the relative overhead value will be satisfied with the sum of the weights of features which the feature configuration manager 109 activated.

To activate or deactivate a feature, the feature configuration manager 109 configures the feature properties and flags to achieve the indicated setting. If a feature is to be activated, the feature configuration manager 109 sets the feature flags and/or properties to the corresponding "on" setting listed in the feature entry in the configuration file 108. Similarly, if a feature is to be deactivated, the feature configuration manager 109 sets the feature flags and/or properties to the corresponding "off" setting listed in the feature entry in the configuration file 108. Activation or deactivation of some features may not complete without a restart of the application 102. If the application 102 should be restarted in order to complete the feature configuration which achieves the indicated relative overhead value, the agent 103 generates a notification that the current feature configuration may not be fully implemented until an application restart event occurs. The monitoring agent 103 may still monitor the application 102 with the features which were successfully configured until the restart is invoked.

In an embodiment, at stage C, a feedback collection manager 110 evaluates reports and/or feedback related to runtime resource consumption and/or feature override activity for incorporation into recalculated weights or reassigned priorities. Evaluation of runtime resource consumption may thus allow for adaption of the weights and/or priorities based on monitoring of the deployment environment. Weights and priorities may be recalculated or reassigned to improve the accuracy with which the values stored in the configuration file 108 reflect the deployment environment and customer feature configuration preferences.

The feedback collection manager 110 monitors activity of overhead contribution from active features and patterns in utilization of the configuration override 106. The configuration override 106 provides the option to manually activate or deactivate a feature independent of the slider 107. Features can be manually activated or deactivated in the event that the feature configuration resulting from changing the relative overhead value with the slider 107 is not desired. For example, if decreasing the relative overhead value with the slider 107 deactivates feature 104b, selecting the configuration override 106 provides the option to manually activate feature 104b. In some embodiments, if a feature has been manually configured, the feature weight will not be accounted for in subsequent overhead calculations when adjusting feature availability. The feature will thus remain in the state of activation in which it was manually configured until it its manually configured to the alternate state.

After adjusting the relative overhead value with the slider 107 and subsequently activating or deactivating a feature manually with the configuration override 106, the feature configuration manager 109 may select additional features to activate or deactivate to account for the relative overhead contributed by the feature for which configuration was overridden. As an example, if all of the features 104a-c are inactive and the relative overhead value is increased, features 104a and 104b may be activated. Feature 104b may then be manually deactivated with the configuration override 106. Because the application overhead which is incurred will decrease after feature 104b is deactivated, the feature configuration manager 109 can analyze the remaining inactive features to determine if activation of any of the features will achieve the relative overhead value selected with the slider 107. The feature configuration manager may determine that the addition of the weight of feature 104c is within the selected relative overhead value and can then activate feature 104c. The selected relative overhead value can then still be satisfied after the manual deactivation of feature 104b. The configuration override 106 thus removes a feature from consideration for calculation of the relative overhead value. Detection of override events therefore can prompt the feature configuration manager 109 to reconfigure features to account for the removal or addition of the weight of the feature for which configuration was overridden.

Monitoring of feature resource consumption may be triggered by activation of the feature or may occur in predetermined time increments (e.g., weekly re-evaluation of resource consumption weights). Changes in resource consumption resulting from feature activity are detected by the feedback collection manager 110. If the feedback collection manager 110 detects that the feature resource consumption for a feature surpasses a predetermined threshold for weight reconfiguration, the relative contribution to overhead based on runtime monitoring of resource consumption will be calculated for the feature. The recalculated weight is stored as the relative resource consumption weight feature parameter in an update to the configuration file 108.

The feedback collection manager 110 considers patterns in use of the configuration override 106 by obtaining as feedback the frequency with which a feature is manually activated or deactivated. The feedback collection manager 110 (or another software component with visibility manual overrides) can track manual overrides. The feedback collection manager 110 can assess a specified or defined window of historical overrides to determine whether a priority weight should be recalculated. If use patterns of the configuration override 106 indicate that a feature is manually activated with a frequency greater than a given threshold, the feature priority may be increased. Correspondingly, if the configuration override 106 activity indicates that a feature is manually deactivated with a frequency greater than a given threshold, the feature priority will be decreased. The determination of the new priority may be based on the priorities of other features. For instance, a boundary may be enforced which dictates a maximum increase in priority which is assigned to a feature with a high frequency of manual activation. As an example, if feature 104*a* has the lowest initial priority and feature 104*b* has the highest initial priority, if feature 104*a* is to be increased in priority, the feedback collection manager 110 may determine that the new priority assigned to feature 104*a* is not to surpass the priority of the highest priority feature 104*b*. The priority of feature 104*a* may be evaluated with respect to feature 104*b* if configuration override activity indicates continued manual activation of the feature 104*a*. Reprioritization or recalculation of a priority for a feature may be based on the rate at which the feature configuration is overridden in a specified time window relative to the other features. Priorities of the rest of the features may be readjusted accordingly relative to the new priorities introduced. New priorities assigned to features will be stored in the configuration file 108.

Though not depicted in FIG. 1, in an embodiment, the feature configuration manager 109 manages monitoring agent feature configuration for an application to which the tool 101 has deployed multiple monitoring agents. For example, the application 102 may be monitored with 50 agents across multiple components of the application 102 with each component having one or more agents associated therewith. The feature configuration manager 109 is responsible for the feature configuration across the 50 monitoring agents. Each of the monitoring agents may have different types of features available for monitoring the application 102 (e.g., half of the agents have feature 104*a* and the other half have features 104*b* and 104*c*). The feature configuration manager 109 thus can activate and deactivate features across multiple monitoring agents in response to a feature configuration event. The feature configuration manager 109 may maintain an additional data structure to record the features for which it is responsible and identifiers of the monitoring agents for which each of the features is available. Upon determining that a feature should be activated which affects the feature configuration of multiple monitoring agents, the feature configuration manager 109 can then identify which of the monitoring agents are affected prior to adjusting the feature configuration. For example, the data structure may indicate that feature 104*a* is available to monitoring agent A and monitoring agent B, but not monitoring agent C. If the feature configuration manager 109 determines that feature 104*a* should be activated, the feature configuration manager 109 can then use the data structure to identify which monitoring agents to reconfigure (i.e., that monitoring agents A and B are affected by the configuration event) before activating the feature 104*a* in the monitoring agents A and B.

Operations depicted at stage C may not occur linearly with respect to stages A and B. For instance, the feedback collection manager 110 may process results of runtime resource consumption monitoring in predetermined time increments or after each reconfiguration event. New priorities may be calculated after the number of occurrences in which a feature has been the target of an override event has reached a threshold (e.g., a manual activation frequency of 70%).

Figure 2:
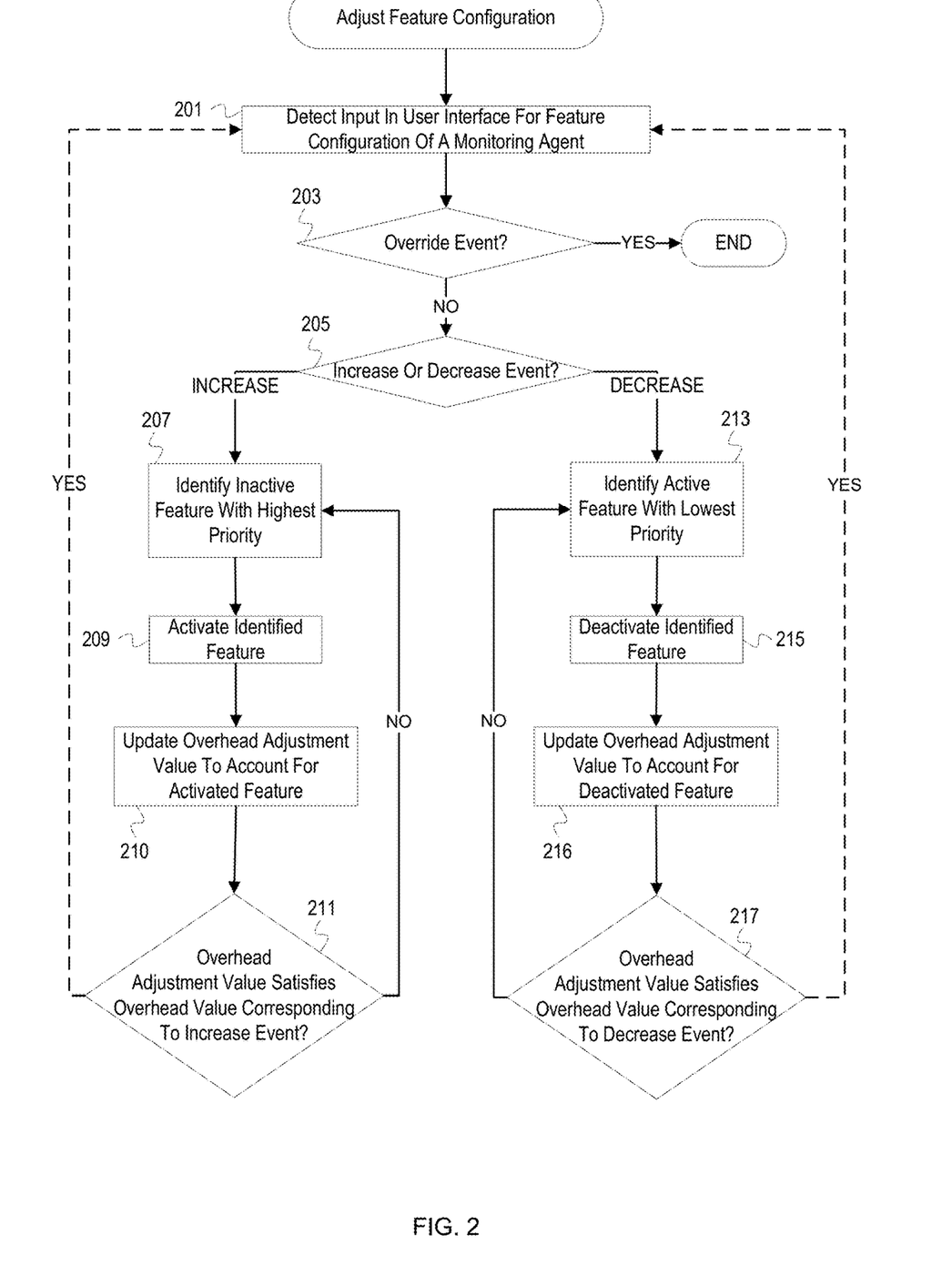
FIG. 2 is a flowchart of example operations for adjustment of application monitoring agent feature configuration based on manipulation of a user-facing feature configuration tool.

FIG. 2 is a flowchart of example operations for adjustment of application monitoring agent feature configuration based on manipulation of a user-facing feature configuration tool. FIG. 2 depicts operations which may be performed by a feature configuration manager which activates and deactivates features available to an agent which has been deployed to monitor an application. The example operations refer to a feature configuration manager as performing the depicted operations for consistency with FIG. 1, although naming of software and program code can vary among implementations.

The feature configuration manager detects input into a user interface for feature configuration of a monitoring agent (201). The input is detected in response to manipulation of a graphical control element. The graphical control element depicts a range of relative overhead values which can be selected through adjustment of the graphical control element (e.g., through adjustment of a slider). The graphical control element also depicts a configuration override button which may be selected. The input may correspond to a relative overhead value adjustment event or a configuration override event.

If the feature configuration manager detects a configuration override event (203), the feature configuration process ends. Selection of the configuration override causes the user interface to present options for overriding feature settings resulting from manipulation of the graphical control element. For instance, another graphic container (e.g., window) can be presented that lists at least those features that have been activated or deactivated in response to manipulation of the graphical element corresponding to a value representing a target level of overhead consumption ("target overhead value") or relative overhead value. The options can also include features not affected by a preceding adjustment. An override selection indicates a manual activation or deactivation of a particular feature and is detected and tracked for possible later priority and/or weight recalculation. The feature configuration manager may update the relative overhead value which is recorded to reflect the addition or removal of the feature from the current feature configuration.

If the feature configuration manager detects manipulation of the relative overhead adjustment slider through an increase or decrease event (205), the feature configuration manager determines if the input corresponds to an increase or a decrease in the relative overhead value. The increase or decrease event is determined based on comparison to a previous relative overhead value for which features are currently configured.

If the input corresponds to an increase event, the feature configuration manager identifies the feature with the highest priority which is currently inactive (207). The feature configuration manager maintains a configuration file which indicates each feature available to the agent as well as the priority and weight for each feature. The feature configuration manager may also maintain a list of the features available to the agent with an indicator for the status of the feature activity (i.e., if the feature is active or inactive). The feature configuration manager examines the features listed in the configuration file which are currently inactive and identifies the inactive feature with the highest priority stored in the configuration file.

The feature configuration manager activates the highest priority feature which it has identified (209). To activate the feature, the feature configuration manager manipulates the agent settings in accordance with a configuration setting listed in the configuration file. The configuration file may indicate a set of instrumentation points to turn on and/or a set of properties for which each of the instrumentation points should be configured. Activating the feature effectively turns on the feature in the agent and makes the feature available to the agent for obtaining application performance metrics.

The feature configuration manager updates the current relative overhead value to account for the activated feature (210). The feature configuration manager tracks the current relative overhead value which accounts for the weights of the application overhead incurred by each of the active features. The weight of the activated feature is added to the current overhead adjustment value. For example, the current relative overhead value may reflect that the active features incurred 50% of the available overhead before the activation of the activated feature. If the activated feature has a weight of 15%, the current relative overhead value will be increased to 65% to indicate that a total of 65% of available application overhead is consumed by the active features with the addition of the activated feature.

The feature configuration manager determines whether the relative overhead value updated to account for the activated feature satisfies the overhead value corresponding to the increase event (211). The overhead value indicated by the increase event ("selected overhead value") identifies an overhead value which should be achieved by the total relative overhead incurred by each active feature. The feature configuration manager should continue activating features in order of highest priority to lowest priority until the selected overhead value has been satisfied. The selected overhead value therefore serves as a threshold for continuation of feature activation. If the updated relative overhead value is less than the selected overhead value, feature activation should continue with the next highest priority inactive feature. Otherwise, if activation of the feature contributes a relative overhead amount which results in satisfying the selected overhead value, the feature configuration manager discontinues feature activation and returns to awaiting detection of an input event.

If the input corresponds to a decrease event, the feature configuration manager identifies the feature with the lowest priority which is currently active (213). As similarly described with reference to detection of an increase event, the feature configuration manager maintains a configuration file which lists feature priorities. The feature configuration manager examines the features listed in the configuration file which are currently active and identifies the active feature with the lowest priority stored in the configuration file.

The feature configuration manager deactivates the lowest priority feature which it has identified (215). To deactivate the feature, the feature configuration manager manipulates the agent settings in accordance with a configuration setting listed in the configuration file. The configuration file may indicate a set of instrumentation points to turn off and/or a set of properties for which each of the instrumentation points should be configured. Activating the feature effectively turns off the feature in the agent and renders the feature unavailable to the agent for obtaining application metrics.

The feature configuration manager updates the current relative overhead value to account for the deactivated feature (216). The feature configuration manager tracks the current relative overhead value which accounts for the weights of the application overhead incurred by each of the inactive features. The weight of the deactivated feature is subtracted from the current overhead adjustment value. For example, the current relative overhead value may reflect that the active features incurred 70% of the available overhead before the activation of the activated feature. If the deactivated feature has a weight of 15%, the current relative overhead value will be decreased to 55% to indicate that a total of 55% of available application overhead is incurred by the active features with the removal of the overhead incurred by the deactivated feature.

The feature configuration manager determines whether the relative overhead value updated to account for the deactivated feature satisfies the overhead value corresponding to the decrease event (217). The selected overhead value indicated by the decrease event identifies an overhead value which should be achieved by the total relative overhead incurred by each inactive feature. The feature configuration manager should continue deactivating features in order of lowest priority to highest priority until the selected overhead value has been satisfied. The selected overhead value therefore serves as a threshold for continuation of feature deactivation. If the updated relative overhead value is greater than the selected overhead value, feature activation should continue with the next lowest priority active feature. Otherwise, if deactivation of the feature results in a relative overhead amount which satisfies the selected overhead value, the feature configuration manager discontinues feature deactivation and returns to awaiting detection of an input event.

Figure 3:
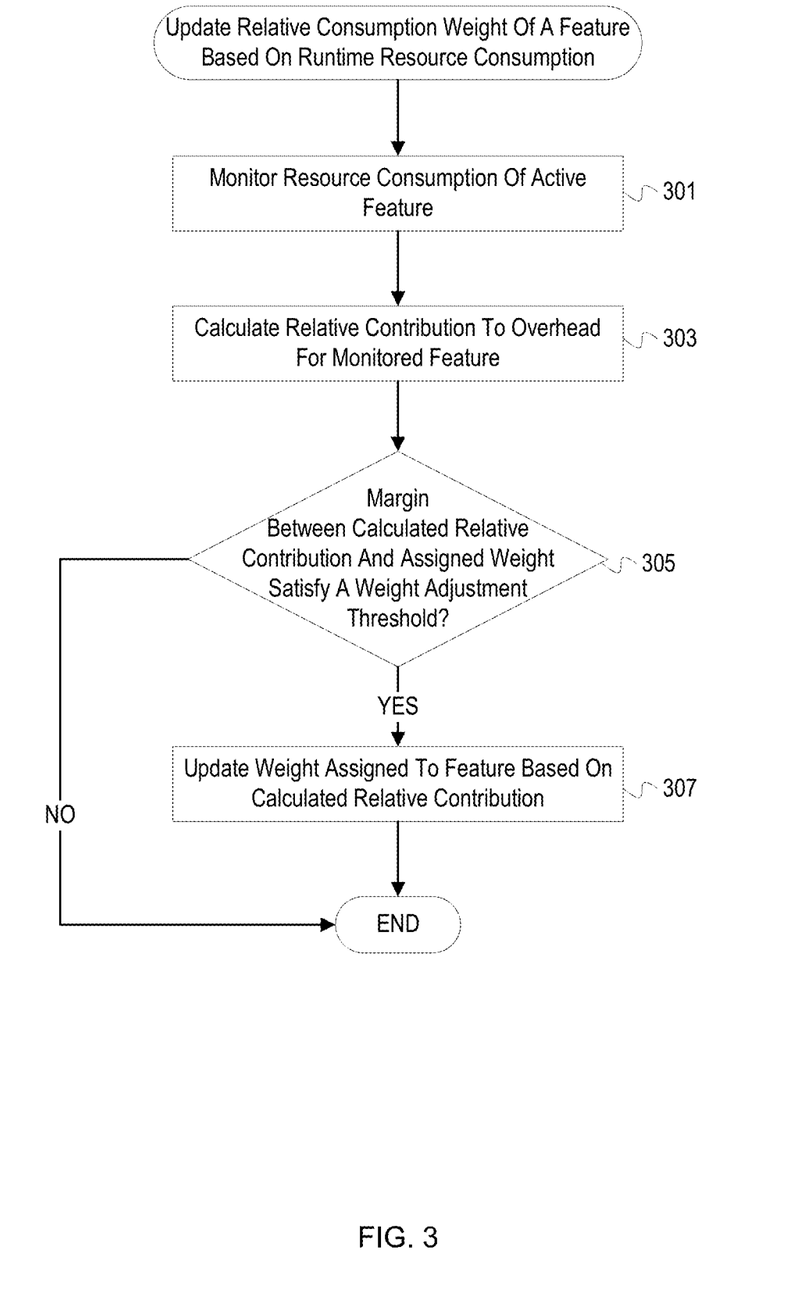
FIG. 3 is a flowchart of example operations for updating the relative resource consumption weight of a feature based on its resource consumption calculated at runtime.

FIG. 3 is a flowchart of example operations for updating the relative resource consumption weight of a feature based on its resource consumption calculated at runtime. The example operations refer to a feedback collection manager as performing the depicted operations for consistency with FIG. 1, although naming of software and program code can vary among implementations.

The feedback collection manager monitors the resource consumption of an active feature (301). The feedback collection manager may monitor the feature's resource consumption with respect to CPU cycles used, memory consumption, and delay in response time caused by feature activity. Runtime monitoring of resource consumption permits determination of which of the features are consuming a greater proportion of resources relative to other features. Features can be monitored for an active feature with instrumentation point timers that establish a start time and stop time for collection of resource consumption metrics. For example, CPU cycles can be monitored after starting a CPU timer. Metrics related to CPU activity will be collected until the CPU timer finishes. Examination of the CPU cycles observed between the start and stop times at the instrumentation points can be used to determine how the feature activity affected the total CPU cycles observed. Monitoring can be triggered manually, based on a schedule, or based on another monitor triggering criteria (e.g., determination that manual override has been detected a threshold number of times within a time period).

The feedback collection manager calculates the relative contribution to overhead for the monitored feature (303). The feedback collection manager determines the total amount of application overhead which the active feature incurs (e.g., latency) based on metrics obtained while monitoring runtime resource consumption. The relative contribution to overhead is calculated based on the proportion of the application overhead which the feature incurred relative to the total amount of application overhead which would be incurred by activation of each of the available features. For instance, the resource consumption observed while each of the monitoring features are active can be established as a maximum relative overhead value of 100%. Relative overhead values of different combinations of active features are then measured with respect to the maximum relative overhead value. As an example, if the monitored application incurs 50% of the total possible application overhead, the relative contribution to overhead for the feature is calculated to be 50%.

The feedback collection manager determines whether a margin between the calculated relative contribution to overhead and the relative resource consumption weight assigned to the feature satisfies a weight adjustment threshold (305). The weight adjustment threshold indicates a maximum allotted deviation of the observed relative resource consumption from the assigned weight in order for the feature to maintain the assigned weight. Calculation of an observed relative resource consumption which deviates from the assigned weight by more than the amount of the weight adjustment threshold should prompt for reassignment of the feature weight. The weight adjustment threshold may be a raw value with respect to resource consumption (e.g., a number of CPU cycles and/or milliseconds of response time delay) or a percentage. For example, the weight adjustment threshold may indicate that a difference between the weight and the observed relative overhead contribution which is greater than a margin of 5% of the total contribution to overhead should result in reassignment of the feature weight.

If the margin satisfies the weight adjustment threshold, the feedback collection manager updates the weight which is assigned to the feature based on its calculated relative contribution to overhead (307). The new feature weight is the calculated relative contribution to overhead based on monitoring of runtime resource consumption. For example, the feature may have been assigned a weight of 15%. If the feature is observed as actually contributing to 5% of the total possible resource consumption, the feature weight is updated to be 5%. The new feature weight may subsequently be stored in an updated configuration file to be considered for future relative overhead value adjustment events.

Figure 4:
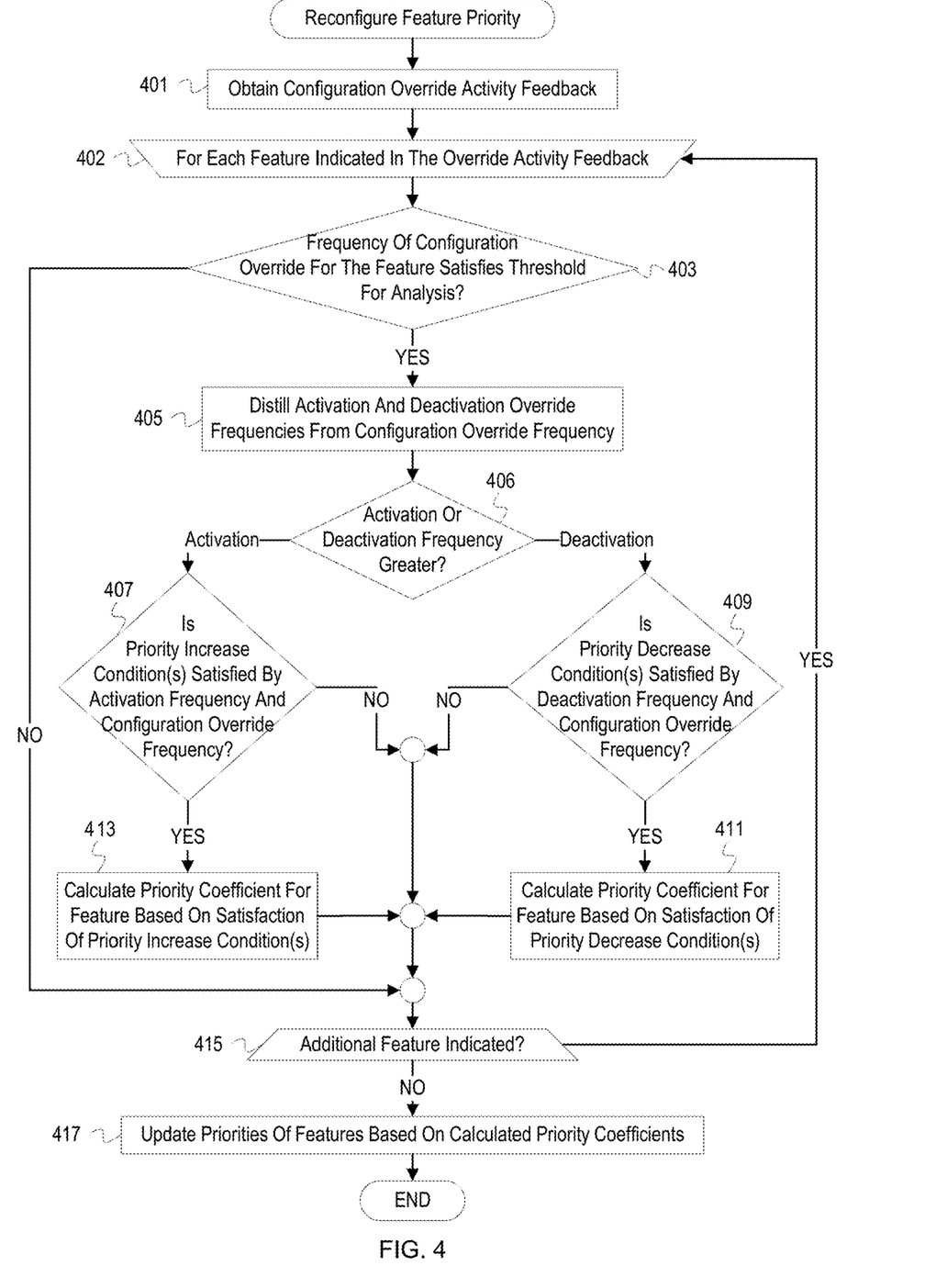
FIG. 4 is a flowchart of example operations for reconfiguring a priority assigned to a feature based on a frequency with which the feature configuration is overridden.

FIG. 4 is a flowchart of example operations for reconfiguring a priority assigned to a feature based on a frequency with which the feature configuration is overridden. The example operations refer to a feedback collection manager as performing the depicted operations for consistency with FIG. 1, although naming of software and program code can vary among implementations.

The feedback collection manager obtains configuration override activity feedback (401). The configuration override activity feedback may be an accumulation of monitored configuration override activity and/or collection of user feedback related to the features which are most frequently configured manually. The feedback for each feature can be presented as an aggregate value indicating a total number of feature override events and/or a proportion of feature override events relative to total feature configuration events. The configuration override events can include both manual activation events and manual deactivation events. For example, the configuration override activity feedback obtained for a certain feature may indicate that the feature configuration is overridden after 75% of feature configuration events. The feedback may further indicate that 80% of the configuration override events are activation events and the remaining 20% are deactivation events.

The feedback collection manager examines each feature indicated in the configuration override activity feedback (402). Features may be included in the configuration override activity feedback after the frequency of manual feature configuration events reaches a threshold for initial examination. For instance, features may be indicated in the feedback after at least one manual configuration event which affects the feature.

The feedback collection manager determines if the frequency of configuration override for the feature satisfies a threshold for analysis of the feature priority (403). The threshold for analysis corresponds to a frequency of configuration override which, when exceeded, prompts for reconsideration of assigned feature priorities. For example, the threshold may indicate that the priority of a feature for which configuration is overridden for at least three out of five feature configuration events should be further examined.

If the frequency of configuration override satisfies the threshold for analysis of the feature priority, the feedback collection manager distills the activation and deactivation override frequencies from the configuration override frequencies (405). The feedback collection manager distinguishes which events of the total configuration override events correspond to manual activation events and which correspond to manual deactivation events. The feedback collection manager can examine the override activity feedback to determine the proportions of the aggregate configuration override event count which correspond to each configuration override event type.

The feature configuration manager determines whether the frequency of manual activation or the frequency of manual deactivation is greater (406). The feature configuration manager compares the frequencies of each configuration override event type. If the feature is manually activated and manually deactivated with the same frequency (i.e., frequencies of 50% for both activation and deactivation), the frequency configuration manager may determine that the frequencies do not indicate a preference for the feature configuration and will discontinue the feature priority analysis.

If the feature configuration is more frequently overridden to manually activate the feature, the feedback collection manager determines if priority increase conditions are satisfied by the frequencies of activation and configuration override (407). The priority increase conditions may indicate a threshold for the frequency of activation which should be satisfied in order to increase the priority. The priority increase conditions may also indicate a total frequency of configuration override which should be satisfied in addition to the activation frequency. For example, the priority increase conditions may establish that a feature priority should be increased if it is manually configured after 60% of feature configuration events and if 70% of the feature configuration events correspond to manual activation events.

If the priority increase conditions are satisfied, the feedback collection manager calculates a priority coefficient for the feature based on the satisfaction of the priority increase conditions (413). The feedback collection manager may consider the margin or degree with which the configuration override frequency and/or the activation frequency satisfy the priority increase conditions when calculating the priority coefficient. For instance, a priority coefficient which indicates a higher priority will be calculated for a feature for which configuration override activity satisfied the priority increase conditions by a wide margin. As an example, the priority increase conditions may indicate that a configuration override frequency of 70% and an activation frequency of 75% should be satisfied in order to calculate a priority coefficient for a feature. If a feature has an observed configuration override frequency of 85% and an activation frequency of 90%, the calculated priority coefficient will likely contribute to a considerable increase in the feature priority. The feedback collection manager may consider the priority currently assigned to the feature to ensure that the new priority does not surpass the existing highest priority features without additional analysis.

If the feature configuration is more frequently overridden to manually deactivate the feature, the feedback collection manager determines if priority decrease conditions are satisfied by the frequencies of deactivation and configuration override (409). The priority decrease conditions may indicate a threshold for the frequency of deactivation which should be satisfied in order to decrease the priority. The priority decrease conditions may also indicate a total frequency of configuration override which should be satisfied in addition to the deactivation frequency. For example, the priority decrease conditions may establish that a feature priority should be decreased if it is manually configured after 65% of feature configuration events and if 75% of the feature configuration events correspond to manual deactivation events.

If the priority decrease conditions are satisfied, the feedback collection manager calculates a priority coefficient for the feature based on the satisfaction of the priority decrease conditions (411). The feedback collection manager may consider the margin or degree with which the configuration override frequency and/or the deactivation frequency satisfy the priority decrease conditions when calculating the priority coefficient. For instance, a priority coefficient which indicates a lower priority will be calculated for a feature for which configuration override activity satisfied the priority decrease conditions by a wide margin. As an example, the priority decrease conditions may indicate that a configuration override frequency of 65% and a deactivation frequency of 70% should be satisfied in order to calculate a priority coefficient for a feature. If a feature has an observed configuration override frequency of 85% and a deactivation frequency of 85%, the calculated priority coefficient will likely result in a considerable decrease in the feature priority. The feedback collection manager may consider the priority currently assigned to the feature to ensure that the new priority is not lower than that of the existing lowest priority features without additional analysis.

The feedback collection manager continues examination of feature configuration override activity for the remaining features (415). Once feature configuration override analysis is complete, feature priorities can be updated to more accurately reflect preferences for monitoring agent feature availability in the deployment environment.

The feedback collection manager updates the priorities of features based on the calculated priority coefficients (417). The feedback collection manager identifies each of the features for which the priority should be updated based on the resulting priority coefficients calculated for the features which satisfied the priority update conditions. The feature priorities may be reordered based on the calculated priority coefficients. Alternatively, the feedback collection manager may calculate a new priority based on the priority coefficient. For instance, the method of priority reassignment may indicate that a priority for a feature with a priority coefficient of 2 should increase by two priority levels (e.g., from the fifth highest priority to the third highest priority). The method of priority reassignment may also indicate that the new priority should be the product of the previous priority and the priority coefficient. The features for which the priority order is affected by the reassignment of priorities will be adjusted accordingly (e.g., the priority of features which have been surpassed in the priority order will decrease accordingly). Once feature priorities have been updated, an updated configuration file may be made available to a feature configuration manager for consideration in subsequent feature configuration events.

Variations

The examples often refer to a "feature configuration manager." The feature configuration manager is a construct used to refer to implementation of functionality for selecting features to activate or deactivate to achieve an indicated amount of application overhead consumption. This construct is utilized since numerous implementations are possible. A feature configuration manager may be a particular component or components of a machine (e.g., a particular circuit card enclosed in a housing with other circuit cards/boards), machine-executable program or programs, firmware, a circuit card with circuitry configured and programmed with firmware, etc. The term is used to efficiently explain content of the disclosure. The feature configuration manager can also be referred to as an overhead management system. Although the examples refer to operations being performed by a feature configuration manager, different entities can perform different operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 2, the operations depicted in blocks 207-209 and 213-215 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
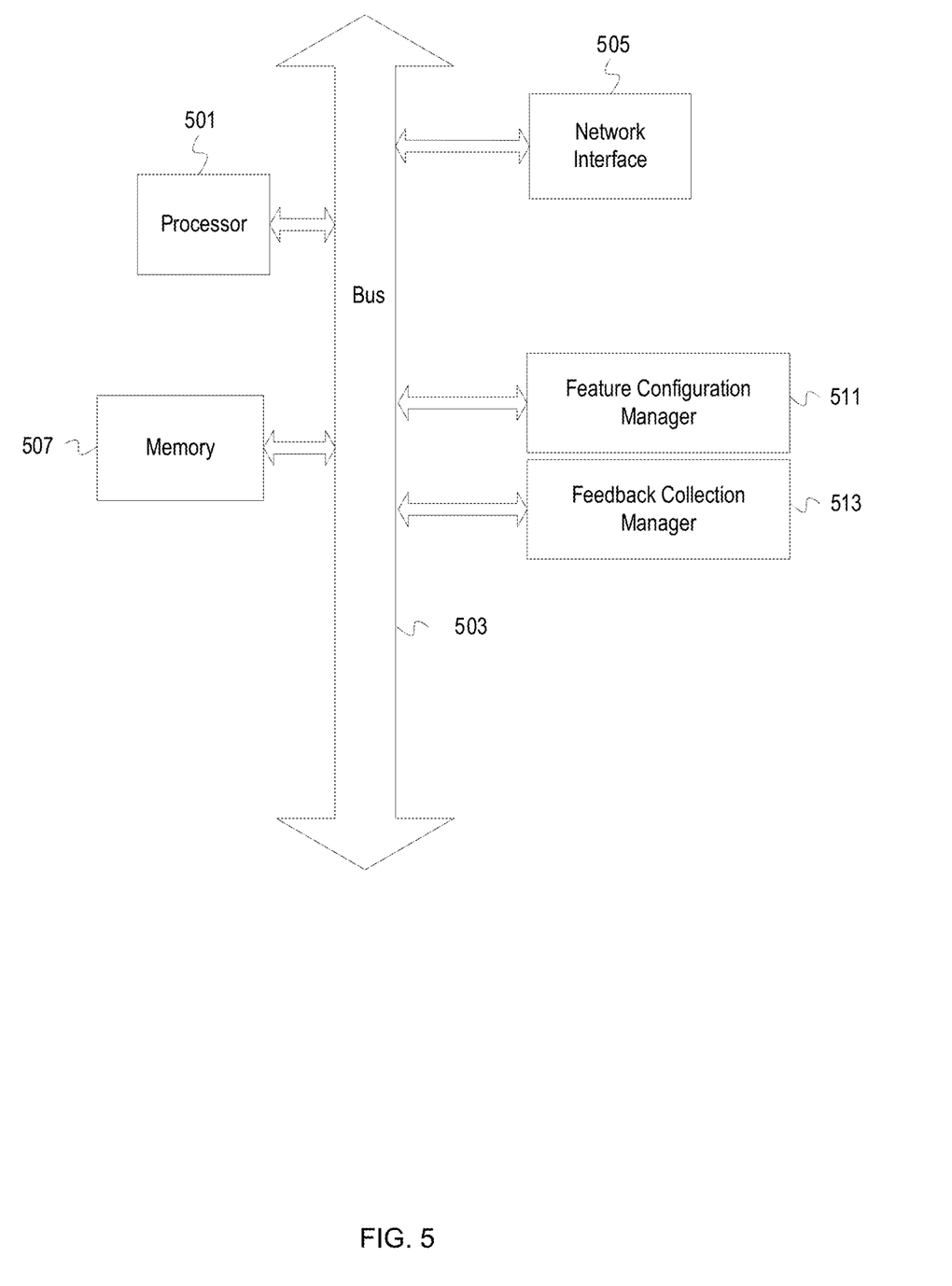
FIG. 5 depicts an example computer system with a feature configuration manager and a feedback collection manager.

FIG. 5 depicts an example computer system with a feature configuration manager and a feedback collection manager. The computer system includes a processor 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes feature configuration manager 511 and feedback collection manager 513. The feature configuration manager 511 detects manipulation of a graphical control element and selects a combination of application monitoring features to activate or deactivate based on the detected manipulation. The feedback collection manager 513 updates weights and priorities assigned to features based on observed resource consumption and manual configuration patterns. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for managing feature availability based on an indicated contribution to overhead which should be achieved as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    based on detection of selection of a first overhead scale value from a scale of overhead values, accessing configuration data for an application monitoring agent that indicates a plurality of features of the application monitoring agent, priorities assigned to the plurality of features, and overhead weights assigned to the plurality of features;
    based on the first overhead scale value being less than a preceding overhead scale value,
        identifying a first set of one or more of the plurality of features to deactivate based on the priorities of the plurality of features and based on a first set of one or more of the overhead weights corresponding to the first set of features satisfying the first overhead scale value; and deactivating the first of one or more features;

based on the first overhead scale value being greater than a preceding overhead scale value, identifying a second set of one or more of the plurality of features to activate based on the priorities of the plurality of features and based on a second set of one or more of the overhead weights corresponding to the second set of features satisfying the first overhead scale value; and activating the second set of one or more features.

2. The method of claim 1, wherein detection of the first overhead scale value is based on manipulation of a graphical control element for configuration of the application monitoring agent.

3. The method of claim 2, wherein the graphical control element depicts the overhead values scale that indicates the first overhead scale value.

4. The method of claim 1, wherein identifying the first set of one or more of the plurality of features to deactivate based on the priorities of the plurality of features and based on a first set of one or more of the overhead weights corresponding to the first set of features satisfying the first overhead scale value comprises incrementally identifying an active feature of the plurality of features beginning with the active feature with the lowest priority and updating a cumulative sum with the one of the overhead weights assigned to the active feature until the cumulative sum satisfies the first overhead scale value.

5. The method of claim 4 further comprising determining whether the cumulative sum is equal to or greater than a difference between the first overhead scale value and the preceding overhead scale value to determine whether the first overhead scale value is satisfied.

6. The method of claim 1, wherein identifying a second set of one or more of the plurality of features to activate based on the priorities of the plurality of features and based on a second set of one or more of the overhead weights corresponding to the second set of features satisfying the first overhead scale value comprises incrementally identifying an inactive feature of the plurality of features beginning with the inactive feature with the highest priority and updating a cumulative sum with the one of the overhead weights assigned to the inactive feature until the cumulative sum satisfies the first overhead scale value.

7. The method of claim 6 further comprising determining whether the cumulative sum is greater than or equal to the first overhead scale value, wherein the cumulative sum includes the overhead weights assigned to already active features.

8. The method of claim 7 further comprising removing a last incrementally identified inactive feature from the second set if the current overhead value decreased by the cumulative sum that includes the one of the overhead weights assigned to the last incrementally identified inactive feature exceeds the first overhead scale value.

9. The method of claim 1 further comprising:

determining a first frequency of configuration override for a first feature of the plurality of features, wherein a configuration override occurred when either an activation or deactivation of the first feature was overridden; and updating a first priority assigned to the first feature based, at least in part, on the first frequency.

10. A non-transitory, computer-readable medium having instructions stored thereon that are executable by a computing device to perform operations comprising:

detecting changing of a monitoring overhead setting from a first value to a second value, wherein the monitoring overhead setting represents overhead that can be contributed by application performance monitoring features;

if the first value is greater than the second value, successively selecting for deactivating the application performance monitoring features in order of priority of the application performance monitoring features from lowest to highest until an accumulative proportional monitoring overhead value satisfies the changed monitoring overhead setting, wherein the accumulative proportional overhead value is based, at least in part, on proportional monitoring overhead values assigned to selected application performance monitoring features; and deactivating at least some of those of the application performance monitoring features selected for deactivating; and if the first value is less than the second value, successively selecting for activating the application performance monitoring features in order of priority of the application performance monitoring features from highest to lowest until an accumulative proportional monitoring overhead value satisfies the changed monitoring overhead setting, wherein the accumulative overhead value is based, at least in part, on proportional monitoring overhead values assigned to selected application performance monitoring features; and activating at least some of those of the application performance monitoring features selected for activating.

11. The non-transitory, computer-readable medium of claim 10 further having instructions stored thereon that are executable by a computing device to perform operations comprising:

displaying a graphical user interface for adjusting resource consumption from overhead monitoring, wherein the graphical user interface comprises a first graphical control element for the monitoring overhead setting, wherein detecting the changing of the monitoring overhead setting is based on manipulation of the first graphical control element.

12. The non-transitory, computer-readable medium of claim 11, wherein the instructions are further executable by a computing device to perform operations comprising displaying the graphical user interface with a second graphical control element for overriding activation or deactivation of an application performance monitoring feature.

13. The non-transitory, computer-readable medium of claim 10, wherein the operations further comprise updating the accumulative proportional overhead value with the proportional overhead value assigned to each selected application performance monitoring feature and comparing the accumulative overhead value after each update to determine whether the accumulative proportional overhead value satisfies the changed monitoring setting.

14. The non-transitory, computer-readable medium of claim 13, wherein the operations further comprise determining whether the accumulative proportional overhead value satisfies the changed monitoring settings based, at least in part, on determining whether the accumulative proportional overhead value is equal to or greater than a difference between the second value and the first value, if the second value is less than the first value.

15. The non-transitory, computer-readable medium of claim 13, wherein the operations further comprise determining whether the accumulative proportional overhead value satisfies the changed monitoring settings based, at least in part, on determining whether the accumulative proportional overhead value is equal to or greater than the second value if the second value is greater than the first value, wherein the accumulative proportional overhead value includes proportional overhead values assigned to already active application performance monitoring features.

16. The non-transitory, computer-readable medium of claim 10 further having stored thereon instructions executable by a computing device to perform operations comprising:
  determining a first frequency of configuration override for a first application performance monitoring feature, wherein a configuration override occurred when either an activation or deactivation of the first feature was overridden; and
  updating a first priority assigned to the first application performance monitoring feature based, at least in part, on the first frequency.

17. An apparatus comprising:
a processor; and
a machine-readable medium having program code executable by the processor to cause the apparatus to,
  detect changing of a monitoring overhead setting from a first value to a second value, wherein the monitoring overhead setting represents overhead that can be contributed by application performance monitoring features;
  based on the changing from the first value to the second value being a decrease in the monitoring overhead setting,
    successively select for deactivating the application performance monitoring features in order of priority of the application performance monitoring features from lowest to highest until a proportional cumulative overhead of the selected application performance monitoring features satisfies the decrease in the overhead monitoring setting; and
    deactivate at least some of those of the application performance monitoring features selected for deactivating; and
  based on the changing from the first value to the second value being an decrease in the monitoring overhead setting,
    successively select for activating the application performance monitoring features in order of priority of the application performance monitoring features from highest to lowest until a proportional cumulative overhead of the selected application performance monitoring features satisfies the decrease in the overhead monitoring setting; and
    activate at least some of those of the application performance monitoring features selected for activating.

18. The apparatus of claim 17, wherein the program code is further executable by the processor to cause the apparatus to:
  generate a graphical user interface for adjusting resource consumption from overhead monitoring, wherein the graphical user interface comprises a first graphical control element for the monitoring overhead setting,
  wherein detection of the changing of the monitoring overhead setting is based on manipulation of the first graphical control element.

19. The apparatus of claim 18, wherein the program code is further executable by the processor to cause the apparatus to display the graphical user interface with a second graphical control element for overriding activation or deactivation of an application performance monitoring feature.

20. The apparatus of claim 17, wherein the program code to successively select for deactivating the application performance monitoring features in order of priority of the application performance monitoring features from lowest to highest the program code being executable by the processor to cause the apparatus to traverse configuration data that indicates the application performance monitoring features, proportional overhead values assigned to the application performance monitoring features, and priorities assigned to the application performance monitoring features.

* * * * *